(12) United States Patent
Murgatroyd et al.

(10) Patent No.: US 6,822,217 B1
(45) Date of Patent: Nov. 23, 2004

(54) OPTICAL SPECTRUM ANALYZER

(75) Inventors: Ian J. Murgatroyd, Birmingham (GB); Catherine A. Sugden, Birmingham (GB)

(73) Assignee: Aston Photonic Technologies Limited (GB)

( * ) Notice: Subject to any disclaimer, the term of this patent is extended or adjusted under 35 U.S.C. 154(b) by 0 days.

(21) Appl. No.: 09/926,016

(22) PCT Filed: Feb. 6, 2000

(86) PCT No.: PCT/GB00/00496

§ 371 (c)(1),
(2), (4) Date: Jan. 24, 2002

(87) PCT Pub. No.: WO00/49376

PCT Pub. Date: Aug. 24, 2000

(30) Foreign Application Priority Data

Feb. 16, 1999 (GB) ............................................. 9903450

(51) Int. Cl.⁷ .................................................. G01J 1/04
(52) U.S. Cl. .......................... 250/227.14; 250/227.18; 385/10; 356/32; 398/84; 398/85
(58) Field of Search ....................... 250/227.14, 227.11, 250/227.23, 227.18, 227.19, 227.16, 231.1, 226, 237 G, 237 R; 356/32, 34, 463, 465; 340/555, 556, 557, 565, 611, 614; 385/7, 8, 9, 10, 13; 359/130, 151, 124, 139, 140, 188

(56) References Cited

U.S. PATENT DOCUMENTS

| | | | | |
|---|---|---|---|---|
| 5,319,435 A | * | 6/1994 | Melle et al. .................. 356/32 |
| 5,469,520 A | | 11/1995 | Morey et al. | |
| 5,694,501 A | * | 12/1997 | Alavie et al. ................. 385/37 |
| 5,706,375 A | * | 1/1998 | Mihailov et al. ............. 385/24 |
| 5,748,312 A | * | 5/1998 | Kersey et al. ............... 356/478 |
| 5,812,711 A | * | 9/1998 | Glass et al. ................... 385/37 |
| 5,982,962 A | * | 11/1999 | Koops et al. ................. 385/37 |
| 6,204,920 B1 | * | 3/2001 | Ellerbrock et al. ......... 356/477 |
| 6,317,539 B1 | * | 11/2001 | Loh et al. ..................... 385/37 |
| 6,466,346 B1 | * | 10/2002 | Mizrahi et al. ............... 398/87 |
| 6,486,462 B1 | * | 11/2002 | Rumer ...................... 250/216 |
| 6,594,081 B2 | * | 7/2003 | Engel et al. ................ 359/578 |
| 6,647,159 B1 | * | 11/2003 | Satorius ......................... 385/7 |
| 6,650,810 B1 | * | 11/2003 | Lieberman et al. ........... 385/37 |
| 6,658,171 B2 | * | 12/2003 | Valente et al. ................ 385/10 |
| 6,696,682 B1 | * | 2/2004 | Kempen et al. ....... 250/227.11 |
| 6,738,536 B2 | * | 5/2004 | Boettcher et al. ............. 385/10 |

OTHER PUBLICATIONS

Rao, Yun–Jiang: "In Fibre Bragg Grating Sensors" Measurement Science and Technology, GB, IOP Publishing, Bristol, vol. 8, No. 4, Apr. 1, 1997 pp. 355–375.

Quetel et al: "Programmable Fiber Grating Based Wavelength Demultiplexer" Optical Fiber Communications, US, New York, IEEE, vol. CONG, 19, 1996, pp. 120–121.

* cited by examiner

*Primary Examiner*—Diego Gutierrez
*Assistant Examiner*—Amy R. Cohen
(74) *Attorney, Agent, or Firm*—Buckley, Maschoff & Talwalkar LLC

(57) ABSTRACT

An optical spectrum analyzer (10), receiving a multi-channel optical signal (12). The optical signal (12) is passed through an optical isolator (14) and a fiber coupler (16) to a tunable optical filter. The tunable optical filter comprises one or more fiber Bragg gratings (18) inscribed in a length of optical fiber. The optical fiber is mounted on a means operable to apply a variable strain to the fiber, to they tune the peak wavelength of the Bragg grating (18) over a desired wavelength range, the tunable optical filter thereby reflecting each channel of the input signal (12) in turn. The detector (20) therefore detects a signal only if the input signal (12) contains wavelengths corresponding to the reflection wavelength of a grating (18).

87 Claims, 10 Drawing Sheets

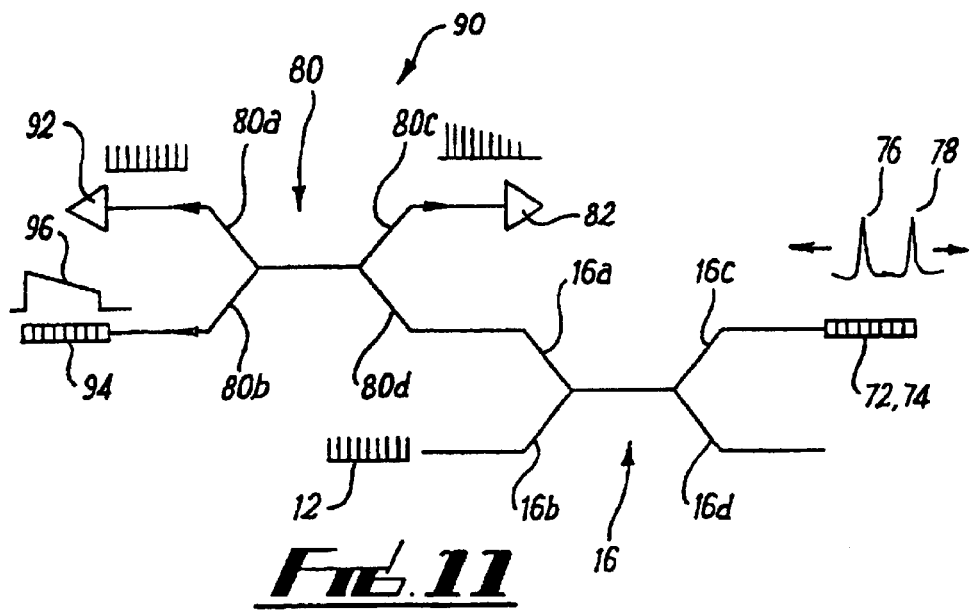
_Fig. 11_
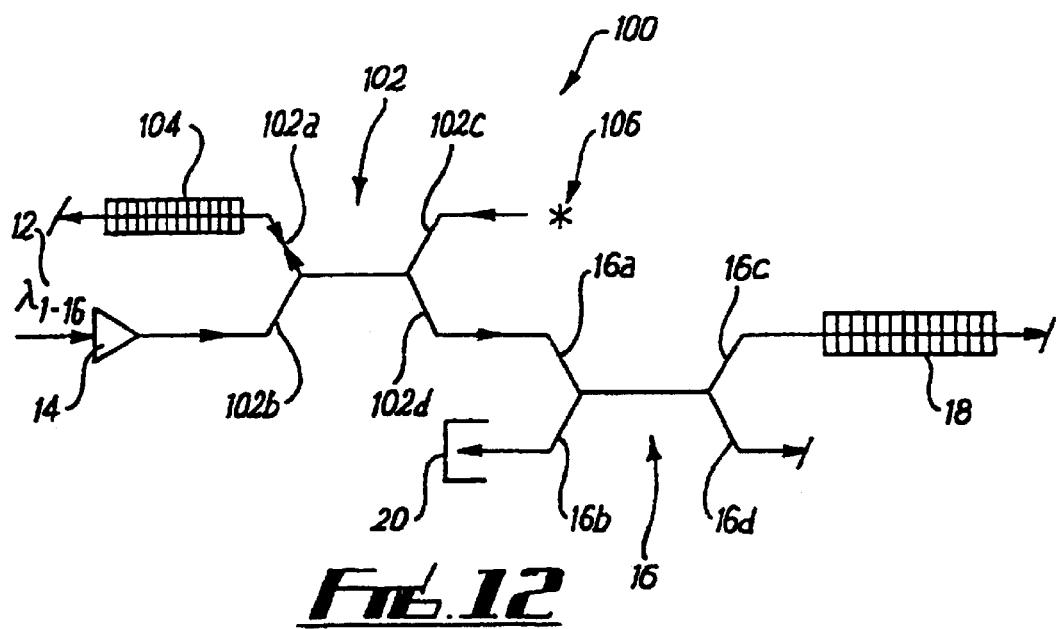
_Fig. 12_

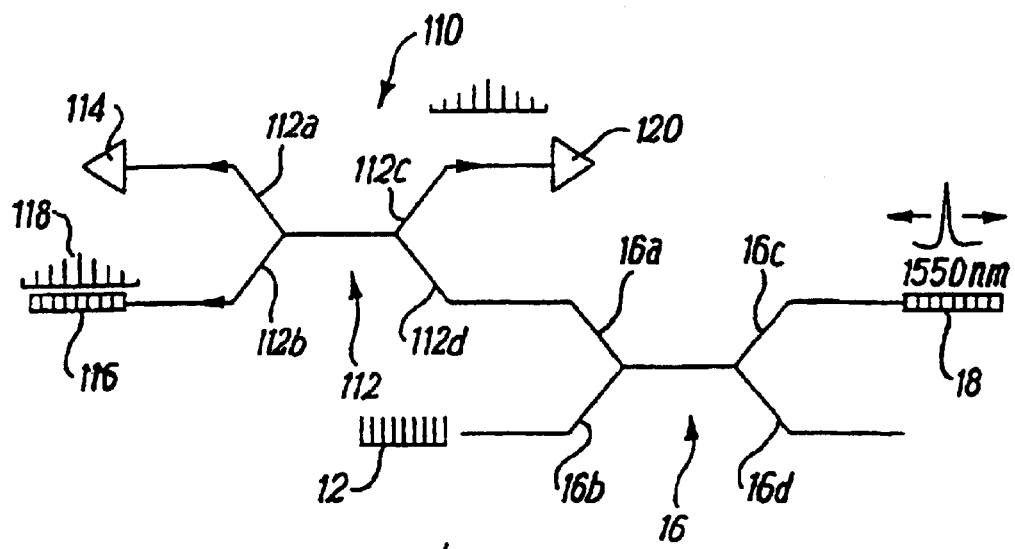
_Fig. 13_
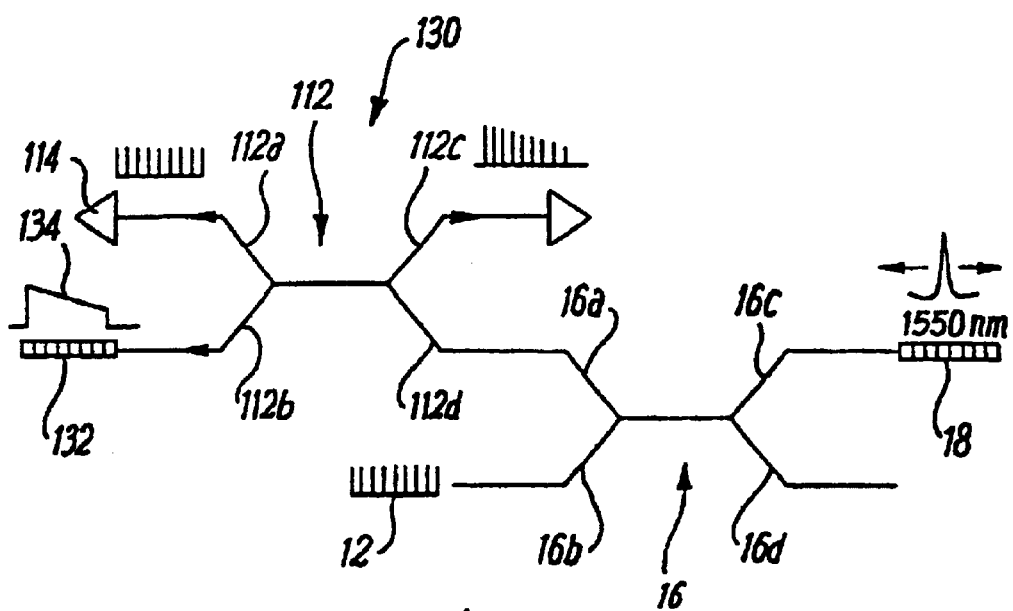
_Fig. 14_

OPTICAL SPECTRUM ANALYZER

The invention relates to an optical spectrum analyzer, particularly, but not exclusively, an optical spectrum analyser for use with a multi-channel optical system.

In this specification a multi-channel optical system means a multi-channel optical telecommunications system, a multi-channel cable television system, an in-fibre Bragg grating sensor system including a plurality of Bragg gratings, or any other optical system generating a plurality of optical signals of different wavelengths.

In multi-channel optical telecommunication systems, 16 or more optical signals travel in each single-mode optical fibre and in cable television system 4 or more optical signals travel in each fibre. Each optical signal is generated by a different laser light source and is of a different wavelength. Each wavelength corresponds to a channel and information is encoded on each channel. There is a requirement that the 16 different wavelengths should be monitored, in order to detect a failure of any laser or a change in the wavelength of any channel. The wavelengths of the telecommunications channels are set by an international standard for channels, known as the ITU grid.

Current technology uses an optical spectrum analyser (OSA) having an optical tuning element in the form of a bulk optic diffraction grating. Light exiting from an optical fibre is focused onto the diffraction grating and the light reflected by the diffraction grating is focused onto an optical detector. As the diffraction grating is rotated, the wavelength of the light which it reflects to the detector gradually changes, and the spectrum of the light is scanned and measured.

There are several disadvantages to using this type of OSA The diffraction grating is subject to mechanical shock and damage, and so the OSA is limited in its ruggedness and tolerance of mechanical vibration. The bulk optic diffraction grating is limited in its accuracy and resolution by its mechanical movement. The position of the diffraction grating is likely to drift with time and may be affected by mechanical backlash, therefore the OSA must be regularly calibrated. The light must be extracted from the optical fibre for measurement, requiring accurate focusing of the light onto the diffraction grating and the optical detector. All of these factors result in a measuring instrument which is limited in its performance, is expensive, and is not well suited for field monitoring of optical systems.

According to one aspect of the present invention there is provided an optical spectrum analyser comprising: a length of optical fibre for receiving an input optical signal; a tuneable optical filter in optical communication with the input fibre, the tuneable optical filter including a first in-fibre Bragg grating inscribed in a first section of fibre, and means operable to apply a variable axial force to the first section of fibre, to thereby time the peak wavelength of the grating over a desired wavelength range; and optical detection means operable to detect an optical signal selected by the tuneable optical filter.

The tuneable optical filter preferably includes first and second in-fibre Bragg gratings inscribed in first and second sections of fibre respectively, the spectra of the gratings having different peak wavelengths. The said means is preferably operable to apply a variable axial force to one or each of the first and second sections of fibre.

The optical spectrum analyser is preferably for use with a multi-channel optical system The channels are preferably substantially equally spaced In wavelength space.

Preferably the peak wavelengths of the gratings are tuneable over different wavelength ranges, the ranges preferably being of substantially the same spectral width The wavelength tuning ranges preferably substantially abut or overlap in wavelength space. Preferably, the combined wavelength tuning range of the two gratings extends from approximately 1530 nanometers to approximately 1560 nanometers. Alternatively, the combined wavelength tuning range of the two gratings may extend from approximately 1580 nanometers to approximately 1620 nanometers.

Preferably the full width half maximum spectral bandwidth of the or each grating is between 0.05 nanometers and 0.5 nanometers, and is most preferably between 0.05 nanometers and 0.2 nanometers. The side-lobe suppression ratio of the or each grating is preferably greater than −20 dB, and is most preferably greater than −30 dB.

The axial force is preferably strain.

The peak wavelength of each grating, when unstrained, is preferably less than the wavelengths of the optical channels present within the respective wavelength tuning ranges of the gratings.

An optical signal selected by the tuneable optical filter is preferably reflected by only one grating.

The optical spectrum analyser preferably further comprises an optical fibre signal routing means, for routing an input optical signal from the input fibre to the tuneable optical filter.

The optical fibre signal routing means is preferably a first optical fibre coupler, one leg on one side of the coupler being communicatively connected to the input fibre and one leg on the other side of the coupler being communicatively connected to the tuneable optical filter. An optical isolator is preferably provided between the input fibre and the one leg on one side of the coupler.

The first and second sections of fibre are preferably located within a grating length of optical fibre, the grating length of fibre being long compared to the lengths of said sections. The first and second sections of fibre, and hence the gratings, are preferably spatially separate within the grating length of fibre. Alternatively, the first and second sections of fibre may be the same section of fibre, the gratings being inscribed in the same section of fibre and thus being superimposed one upon the other.

The difference in the peak wavelengths of the gratings is preferably equal to the wavelength spacing of the optical channels multiplied by a numerical factor. The numerical factor is preferably equal to an integer plus a fraction of one such as one half or one third.

Preferably, the grating length of optical fibre is mounted on the means operable to apply a variable strain, to thereby enable a variable strain to be applied to the first and second sections of fibre, and hence to both gratings, at the same time.

The optical detection means is preferably communicatively connected to the second leg on the one side of the first coupler. The optical detection means preferably comprises a first photodetector.

The optical detection means may further comprise a second optical fibre coupler, one leg on one side of the second coupler being communicatively connected to the photodetector, and one leg on the second side of the second coupler being communicatively connected to the second leg on the one side of the first coupler. The optical detection means may further comprise a second photodetector communicatively connected to the second leg on the second side of the second coupler.

The optical detection means may further comprise a broadband, in-fibre optical filter communicatively connected between the first photodetector and the one leg on one side of the second coupler. The in-fibre optical filter is preferably a chirped in-fibre Bragg grating. The optical bandwidth of the chirped Bragg grating preferably substantially extends over the wavelength tuning range of one of the two gratings, such that the chirped Bragg grating reflects an optical signal reflected by the said one grating to the second photodetector and transmits an optical signal reflected by the other grating to the first photodetector.

Alternatively, the optical detection means may further comprise a broadband, in-fibre optical filter communicatively connected to the second leg on the one side of the second coupler, the optical filter reflecting an optical signal reflected by either grating to the second photodetector. Preferably, the reflectivity of the optical filter varies as a function of wavelength across the optical bandwidth of the optical filter. The reflectivity preferably varies linearly with wavelength across the optical bandwidth of the optical filter. The optical filter is preferably a chirped in-fibre Bragg grating. The optical filter may alternatively be an in-fibre sampled grating.

The optical spectrum analyser preferably further includes means operable to compare the output signals of the first and second photodetectors, to thereby determine the wavelength of the optical signal reflected from one of the gratings. The said means is preferably operable to calculate the ratio of the amplitude of the output signal of the first photodetector to the amplitude of the output signal of the second photodetector, the ratio being indicative of the wavelength of the signal reflected from one of the gratings.

Alternatively, the first and second sections of fibre may be provided in physically separate first and second grating lengths of optical fibre, the grating lengths of fibre being physically long compared to the said sections. Preferably, two optical detection means are provided, a first optical detection means being communicatively connected between one leg on the second side of the first coupler and the first grating length, and a second optical detection means being communicatively connected between the second leg on the second side of the first coupler and the second grating length The detection means preferably each comprise a further optical coupler communicatively connected to the respective grating lengths, the respective legs on the first coupler and to a photodetector. Preferably, one leg on one side of the further optical coupler is communicatively connected to the respective one of the legs on the second side of the first coupler, the second leg on the one side of the further coupler is communicatively connected to the photodetector, and one leg on the second side of the further coupler is communicatively connected to the respective grating length.

Preferably, each of the grating lengths of fibre is mounted on a separate means operable to apply a variable strain to a respective one of the first and second sections of fibre. The said means are preferably operable to enable a variable strain to be applied to each of the first and second sections of fibre at either the same time or at different times.

The optical fibre signal routing means may alternatively comprise an optical fibre circulator.

The optical spectrum analyser preferably further comprises means operable to reduce the signal to noise ratio in the output signal of a or each photodetector. The said means preferably comprises phase-lock loop apparatus connected to the respective means for applying a variable strain and the said photodetector.

The tuneable optical filter may include more than two in-fibre Bragg gratings, each grating being inscribed in a respective section of fibre.

The means operable to apply a variable strain preferably comprises a spaced pair of mandrels, the part of the grating length of fibre including the section or sections of fibre including one or more gratings being mountable therebetween. The mandrels are preferably shaped to avoid sharply bending an optical fibre wound therearound, and are most preferably substantially cylindrical in shape. The mandrels are preferably fabricated from a material which minimises the forces acting between the mandrel and the fibre coating without abrading or chemically altering the fibre coating. The mandrels may be fabricated from a self-lubricating material, such as graphite.

Preferably, a continuous groove is provided around the outer surface of each mandrel, for receiving the parts of the grating length of fibre on either side of the section or sections of fibre including one or more gratings. The groove preferably extends for a plurality of turns around the mandrel, to enable the said lengths of fibre to complete a sufficient number of turns around the mandrel to be held in place on the mandrel by means of frictional forces.

Preferably, the mandrels are movably mounted on a mounting member, and are most preferably rotatably mounted on the mounting member. Alternatively, one mandrel is rotatably mounted on the mounting member and the other mandrel is fixedly mounted on the mounting member. One mandrel is preferably mounted on a motor means operable to rotate the said mandrel.

The means operable to apply a variable strain preferably further comprises a elongate member, in the form of a metal beam, mounted on one end of the said other mandrel and extending to a stop member provided on the mounting member, rotation of the one mandrel exerting a pulling force on the fibre mounted between the mandrels, thereby causing rotation of the other mandrel until the elongate member abuts the stop member, further rotation of the other mandrel thereby being prevented, such that a further rotation of the one mandrel causes strain to be applied to the said fibre and the elongate member.

The means operable to apply a variable strain is preferably constructed so as to minimise the effects of thermal expansion, and is most preferably a thermalised.

An electrical strain gauge may be provided on the elongate member, the strain gauge being operable to measure the strain applied to the elongate member, to thereby enable the amount of strain applied to the section or sections of fibre including one or more gratings, and hence the wavelength of the or each grating in the tuneable optical filter, to be inferred.

The optical spectrum analyser may alternatively or additionally comprise optical calibration apparatus for calibrating the peak, wavelength of the or each grating in the tuneable optical filter.

The optical calibration apparatus preferably comprises: an optical fibre coupler; a first section of fibre having a first reference Bragg grating inscribed therein, the said section of fibre being communicatively connectable to one leg on one side of the calibration coupler; and an optical source communicatively connected to one leg on the second side of the calibration coupler.

The peak wavelength of the first reference grating preferably falls within the wavelength tuning range of one of the gratings in the tuneable optical filter. Preferably, a further reference grating is provided in a further section of fibre for each further grating in the tuneable filter, the peak wavelength of each further reference grating falling within the wavelength tuning range of the corresponding grating. The further section or sections of fibre are preferably each communicatively connectable to the calibration coupler in place of the first section of fibre, each further reference grating thereby replacing the first reference grating.

The peak wavelength of the or each reference grating is preferably known at a specified temperature, from independent calibration. Alternatively, the or each grating may be a thermalised.

The optical source is preferably a light emitting diode. The optical output spectrum of the light emitting diode preferably includes the peak wavelength of the or each reference grating.

The optical calibration apparatus is preferably connectable to the optical spectrum analyser between the input length of fibre and the tuneable optical filter, to thereby provide an alternative input signal to the optical spectrum analyser. Preferably, the second leg on one side of the calibration coupler is communicatively connectable to the input length of fibre and the second leg on the second side of the calibration coupler is communicatively connectable to the one leg on one side of the first coupler.

The optical calibration apparatus may alternatively comprise: an optical fibre coupler; a first section of fibre having a first reference grating inscribed therein, the said section of fibre being communicatively connectable to one leg on one side of the calibration coupler; first and second photodetectors communicatively connected to the second leg on one side and one leg on the second said of the calibration coupler respectively; and means operable to compare the output signals of the photodetectors.

The optical spectrum of the first reference grating preferably falls within the wavelength tuning range of one of the gratings in the tuneable optical filter. Preferably, a further reference grating is provided in a further section of fibre for each further grating in the tuneable filter, the optical spectrum of each further reference grating falling within the wavelength tuning range of the corresponding grating. The further section or sections of fibre are preferably each communicatively connectable to the calibration coupler in place of the first section of fibre, each further reference grating thereby replacing the first reference grating.

Preferably, the reflectivity of the or each reference grating varies as a function of wavelength across its spectral bandwidth, such that the intensity of an optical signal reflected by a reference grating is dependent on the wavelength of the optical signal. The or each reference grating preferably has a plurality of reflectivity peaks included within its spectral profile. The or each reference grating is preferably a sampled grating. The or each reference grating may alternatively be a moiré grating. The or each reference grating may further alternatively comprise an array of uniform period Bragg gratings.

Alternatively, the or each reference grating may be a chirped Bragg grating.

The or each reference grating is preferably a thermalised.

The optical calibration apparatus is preferably connectable to the optical spectrum analyser in place of the or a photodetector within the optical detection means, the first photodetector detecting a part of an optical input signal reflected by the tuneable optical filter and the second photodetector detecting the said part of the input signal reflected by the tuneable optical filter and the reference grating.

Preferably, the outputs of the photodetectors are connected to the means operable to compare the output signals. The said means is preferably operable to calculate the ratio of the output signal of the first photodetector to that of the second photodetector, the ratio being indicative of the wavelength of the detected optical signal.

The optical calibration apparatus may further alternatively comprise: an in-fibre wavelength division multiplexing (WDM) device, one leg on one side of the WDM device being communicatively connectable to the second leg on the second side of the first coupler; a first section of fibre having two in-fibre Bragg gratings inscribed therein and communicatively connected to one leg on the second side of the WDM device; an optical fibre coupler, one leg on one side of the coupler being communicatively connected to the second leg on the one side of the WDM device; a broadband optical source communicatively connected to one leg on the second side of the calibration coupler; a second section of fibre having a reference grating inscribed therein and communicatively connected at one end to the second leg on the second side of the calibration coupler; and a photodetector communicatively connected to the other end of the second section of fibre.

Preferably the peak wavelengths of the gratings are separated by more than their individual wavelength tuning ranges. The peak wavelength of the first grating is preferably within the wavelength tuning range of the tuneable optical filter, and is most preferably within the 1540 nanometers to 1560 nanometers wavelength range. The peak wavelength of the second grating is preferably within the 1290 nanometers to 1310 nanometers wavelength range.

The optical source is preferably a broadband light emitting diode. The optical spectrum of the light emitting diode preferably includes the peak wavelength of the second grating.

The photodetector is preferably operable to detect an optical signal reflected by the second grating.

Preferably, the optical spectrum of the reference grating includes a plurality of passbands such that only wavelengths of light which correspond to the wavelengths of the passbands are transmitted to the photodetector. The reference grating preferably comprises a sampled grating. The reference grating may alternatively comprise a moiré grating. The reference grating may alternatively comprise a chirped Bragg grating. The reference grating is preferably a thermalised.

The first, second, calibration and further optical fibre couplers are preferably each 50:50 2×2 optical fibre couplers. Preferably, the ends of any unconnected legs on any of the couplers are terminated with an angled cleave, to thereby substantially reduce any optical reflections from the said ends. Alternatively, the ends of the said unconnected legs are terminated in an index matching compound, to thereby substantially reduce any optical reflections from the said ends.

The axial force may alternatively be compression.

The optical signal selected by the tuneable optical filter may alternatively be transmitted by one grating.

According to a further aspect of the present invention there is provided a tuneable optical filter comprising: first and second in-fibre Bragg gratings inscribed in first and second sections of optical fibre respectively, the spectra of the gratings having different peak wavelengths, and means operable to apply a variable axial force to one or each of the first and second sections of fibre, to thereby the peak wavelength of the or each grating over a desired wavelength range, wherein the wavelength tuning range of the first grating is adjacent in wavelength space to the wavelength tuning range of the second grating, such that the combined tuning range of the gratings is greater than the tuning range of one grating.

Specific embodiments of the present invention will now be described in more detail, by way of example only, with reference to the accompanying drawings, in which.

Figure 6:
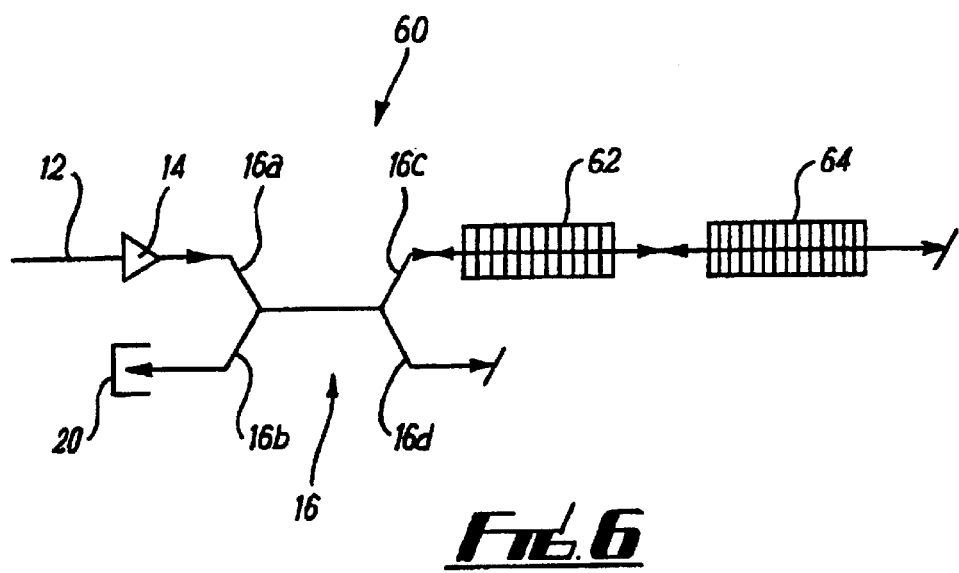
FIG. 6 is a schematic representation of a third OSA according to the present invention.
Figure 7:
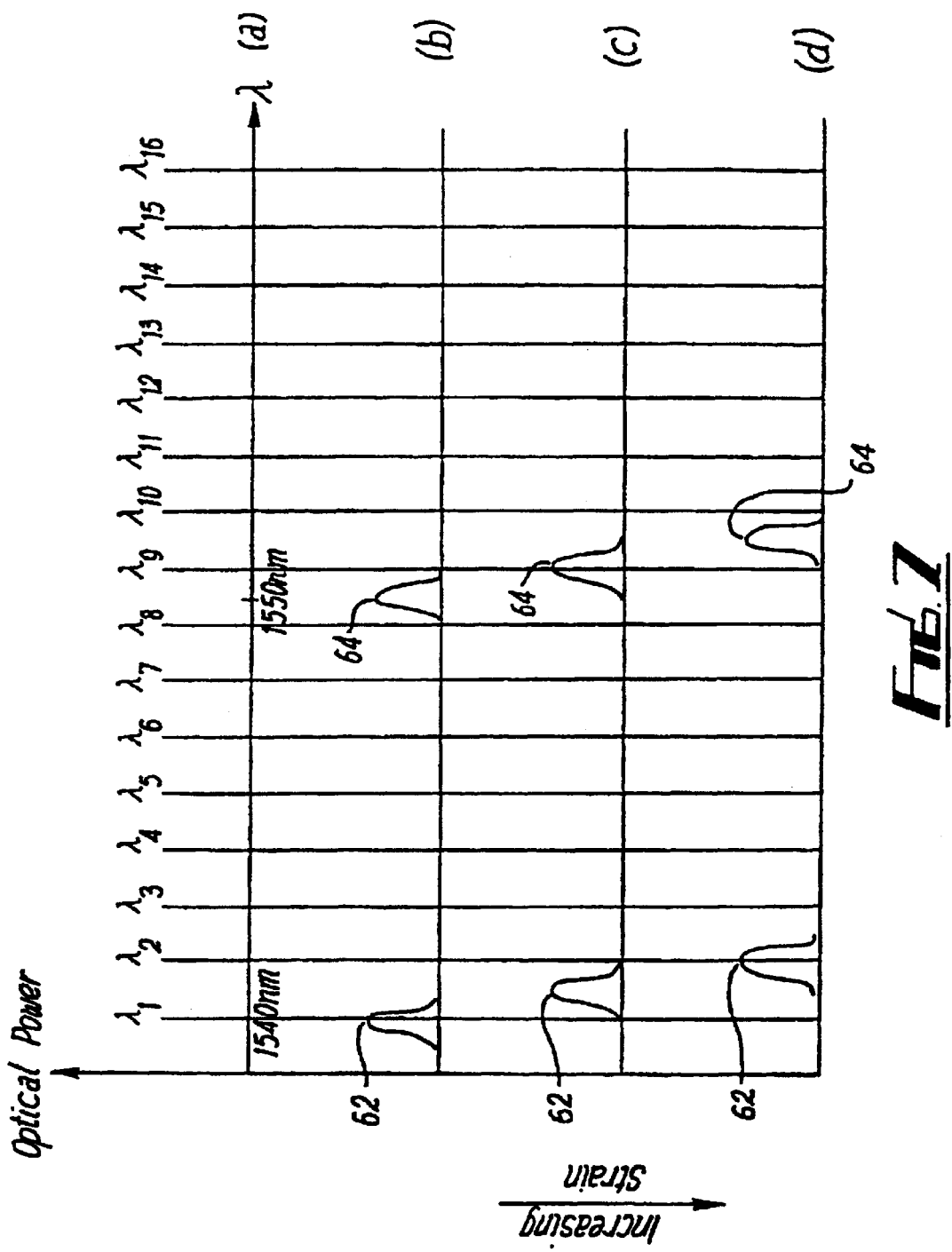
FIG. 7a shows a plot of the input to the OSA of FIG. 6.
Figure 8:
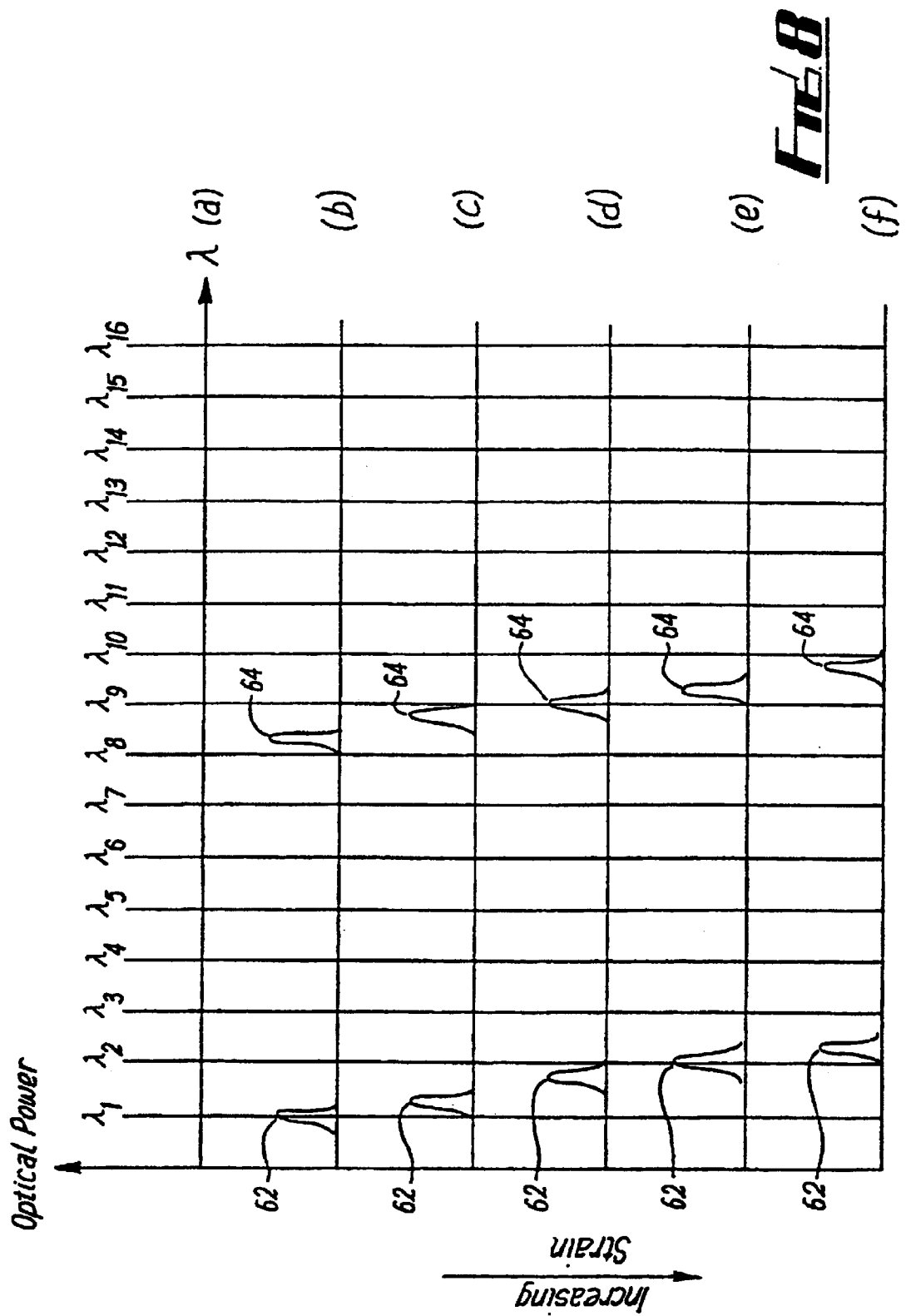
Figure 9:
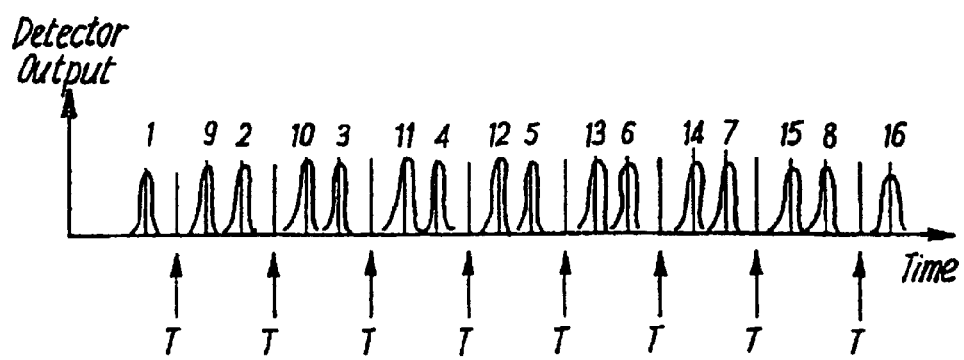
Figure 10:
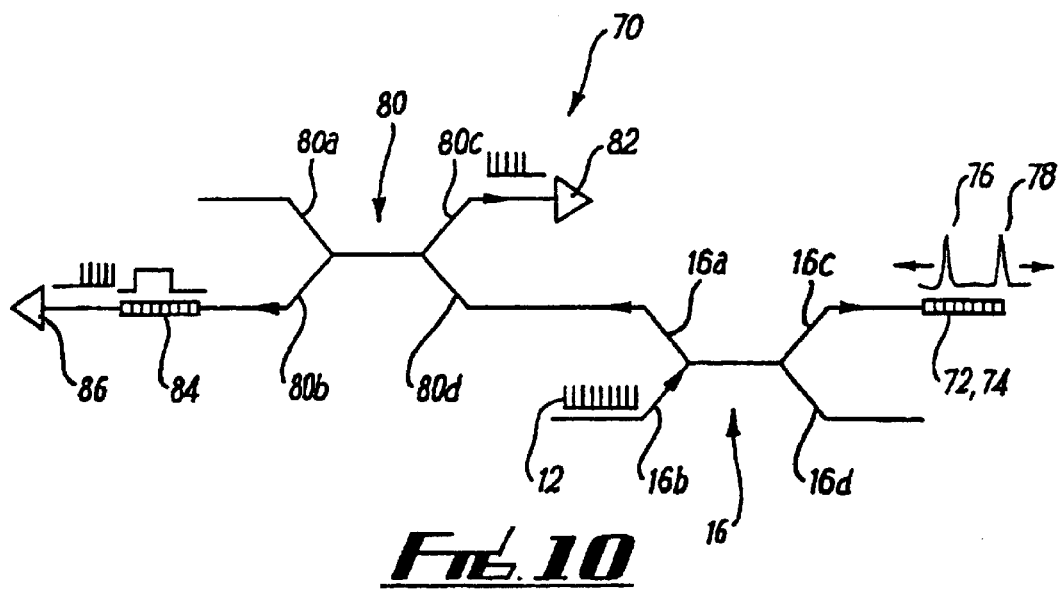
Figure 15:
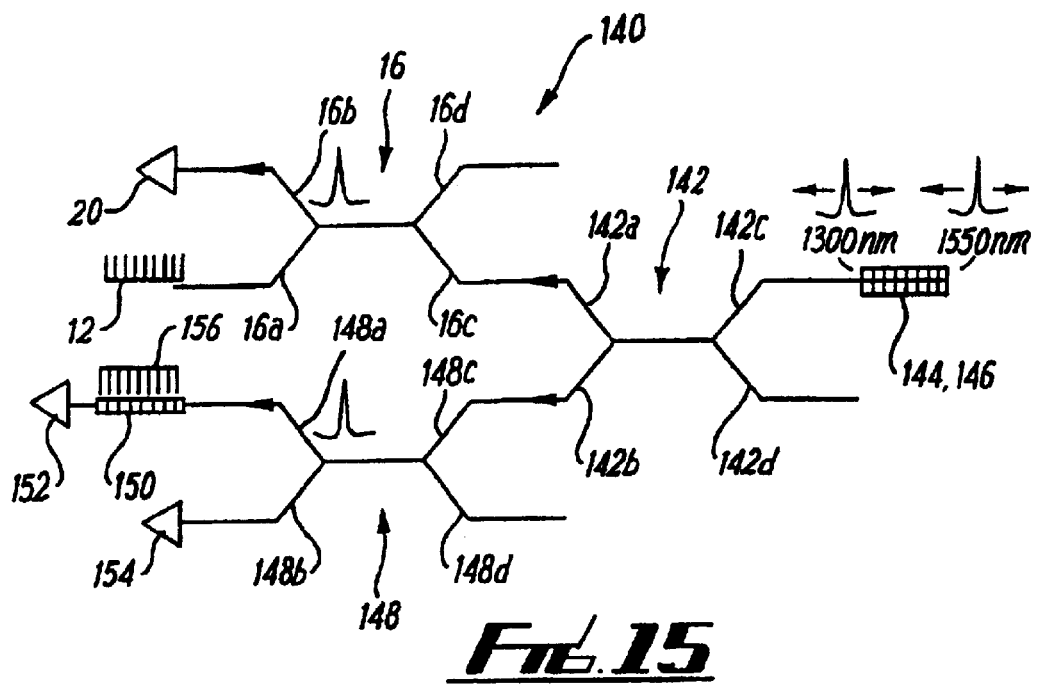
Figure 16:
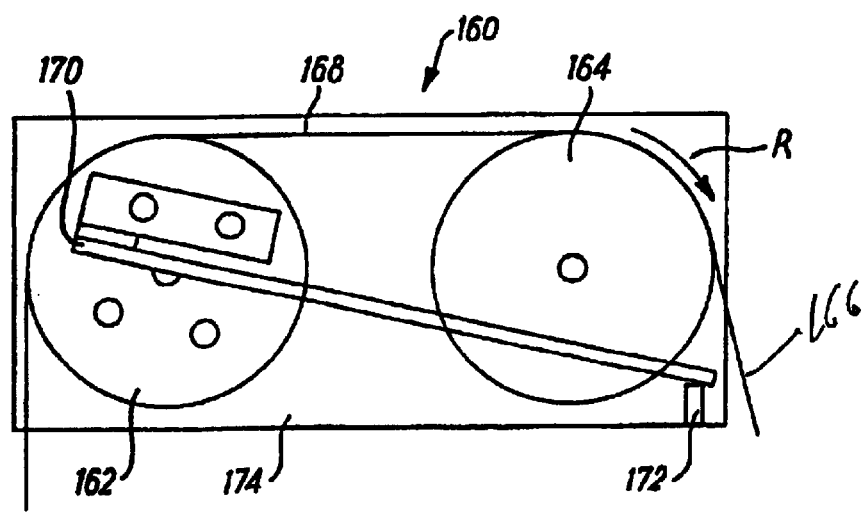

FIGS. 7b–c show plots of the reflection spectra of the gratings of the OSA of FIG. 6 as an increasing strain is applied to the gratings;

FIG. 8a shows a plot of the input to an OSA substantially the same as the OSA of FIG. 6; FIGS. 8b–f show plots of the reflection spectra of the gratings of the OSA to which the input signal of FIG. 8a is input as an increasing strain is applied to the gratings;

FIG. 9 shows a plot over time of the output from the photodetector of the OSA to which the input signal of FIG. 8a is input as an increasing strain is applied to the gratings;

FIG. 10 is a schematic representation of a fourth OSA according to the present invention;

FIG. 11 is a schematic representation of a fifth OSA according to the present invention;

FIG. 12 is a schematic representation of an optical calibration apparatus for use with an OSA according to the present invention;

FIG. 13 is a schematic representation of an alternative optical calibration apparatus for use with an OSA according to the present invention;

FIG. 13 is a further alternative optical calibration apparatus for use with an OSA according to the present invention;

FIG. 14 is a further alternative optical calibration apparatus for use with an OSA according to the present invention;

FIG. 15 is a further alternative optical calibration apparatus for use with an OSA according to the present invention; and FIG. 16 is a diagrammatic plan view of an alternative means for applying a variable strain to a grating in the OSAs of FIGS. 1,5,6,10 and 11.

Figure 1:
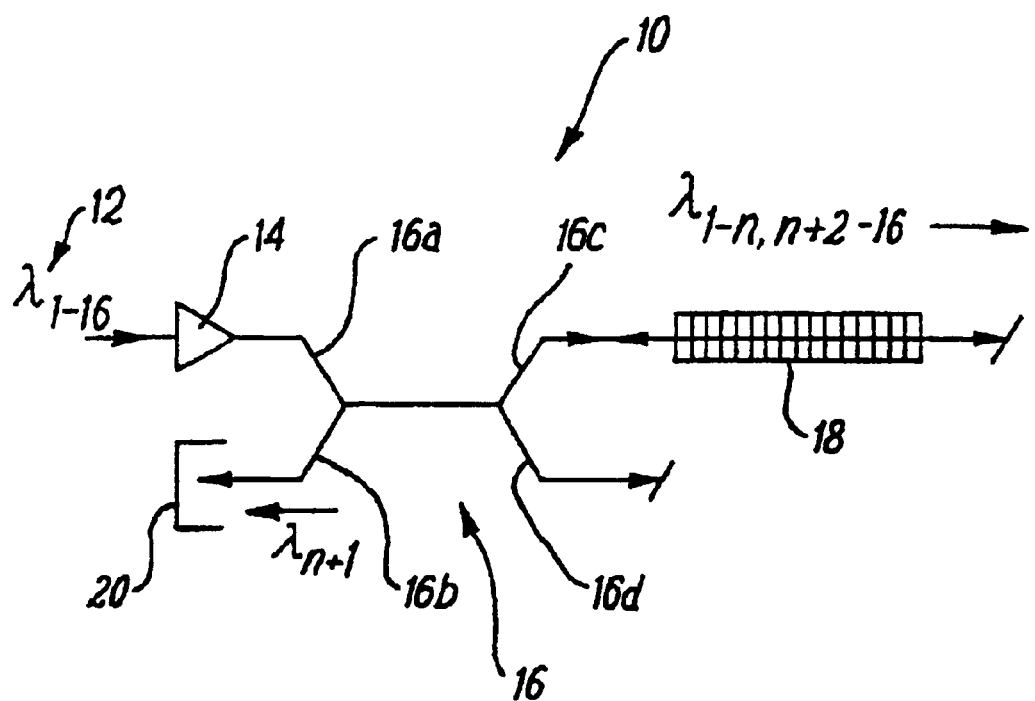
FIG. 1 is a schematic representation of an optical analyser (OSA) according to the present invention.

FIG. 1 shows the architecture for an OSA 10 in which the 16-channel optical signal 12 is passed through an optical isolator 14 into one leg 16a on a first side of a 50:50 2×2 coupler 16. One leg 16c on the other side of the coupler 16 is passed into a fibre Bragg grating (FBG) 18 which reflects back a narrow range of wavelengths into the coupler and thence into the photodetector 20 which is attached to the second leg 16b on the first side of the coupler. The end of the Bragg grating 18 and the second leg 16d on the second side of the coupler are terminated to prevent back-reflection, for instance by using an angled cleave. The detector 20 therefore detects a signal only if the input signal 12 contains wavelengths corresponding to the reflection wave length of the FBG 18.

A fibre Bragg grating will reflect light within a narrow spread of wavelengths. If the fibre Bragg grating is stretched, the period of the Bragg grating will increase, so reflecting a longer wavelength. Conversely, if the grating is compressed, the spacing of the grating will decrease, so reflecting a shorter wavelength.

The OSA can be used for such applications as to scan the spectrum of a multi-channel optical communication signal 12, detecting the presence, power and wavelength of all optical channels present, or for interrogating wavelength sensitive sensor arrays. The optical signal 12 Is passed into a fibre Bragg grating (FBG) 18 which reflects only a narrow range of wavelengths of the light present in the optical signal 12. Any light in the input spectrum 12 which corresponds to the reflection band of the FBG 18 is reflected so that it passes into the detector 20. The wavelength of the light reflected by the FBG 18 into the detector 20 can be tuned over a chosen wavelength range applying ran axial force to the Bragg grating 18, so scanning the whole spectrum of signal 12.

Figure 2:
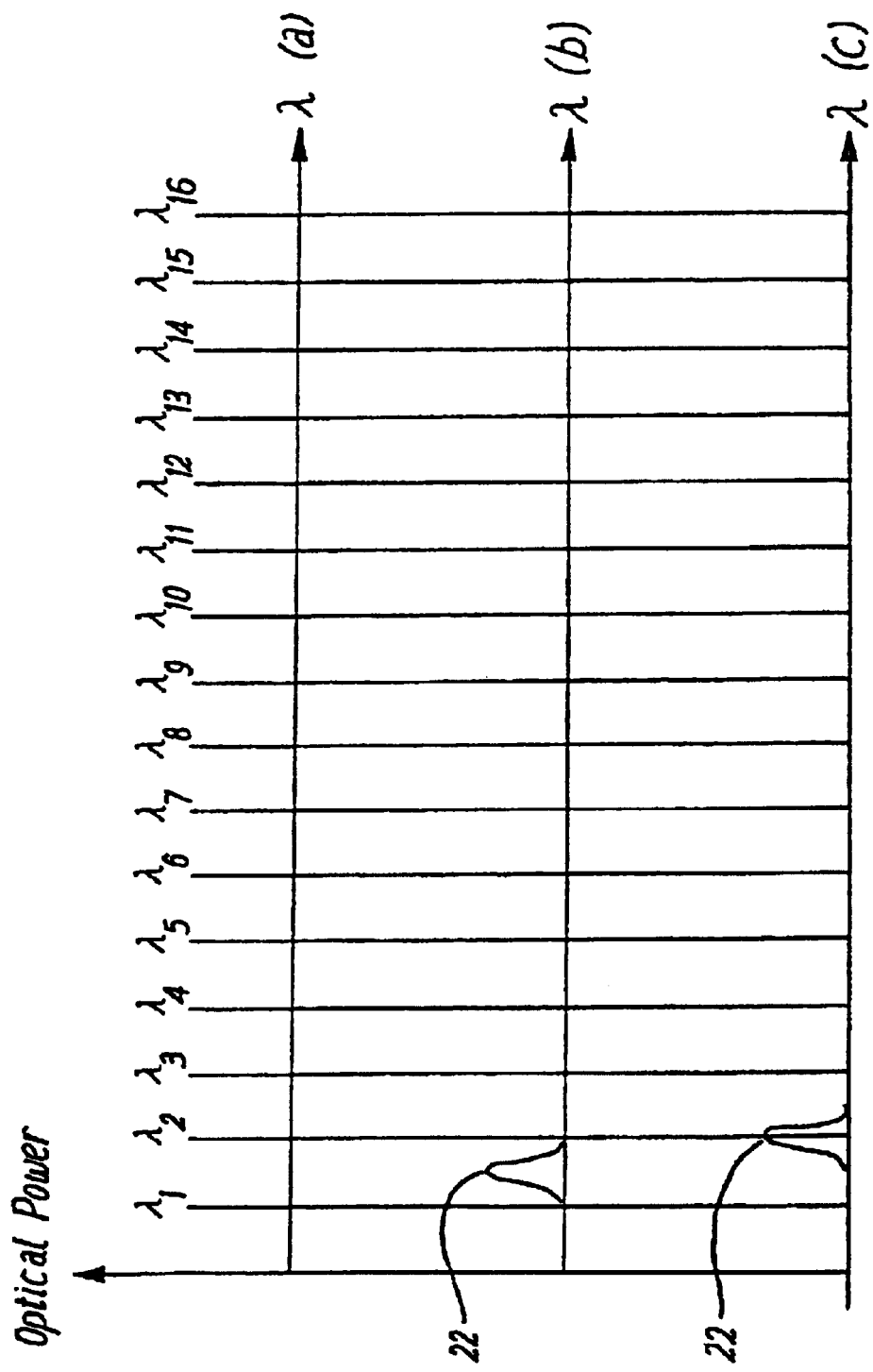
FIG. 2a shows a plot of the input to the OSA of FIG. 1.
FIG. 2b shows a plot of the reflection spectrum of the in-fibre Bragg grating of the OSA of FIG. 1, with no strain applied to the grating.
FIG. 2c shows a plot of the reflection spectrum of the in-fibre Bragg grating of the OSA of FIG. 1, with a strain applied to the grating.

FIG. 2a shows the 16-channels $\lambda 1$-$\lambda 16$ of the optical input signal 12, each channel being at a different wavelength. FIG. 2b shows the case where the FBG 18 reflection band 22 falls between two optical channels in the input signal 12, and so no light is reflected back into the detector 20. FIG. 2e shows a case where the reflection band 22 of the FBG 18 corresponds to the wavelength of one of the optical channels, hence the detector 20 receives a signal if that channel is present in the input signal In this invention, the unstrained grating 18 has a reflection band whose peak wavelength is slightly shorter than any of the wavelengths in the optical signal 12, and so, in its unstrained state, it will not reflect light into the detector 20. However, as the grating 18 is strained, the reflection band progressively passes through each of the optical channels, in-turn reflecting each of the channels. Therefore, as the grating 18 is strained the optical spectrum of the input signal 12 is scanned.

Alternatively, the unstrained grating 18 may have a reflection band whose peak wavelength is slightly longer than any of the wavelengths in the optical signal 12, and so, in its unstrained state, it will not reflect light into the detector 20. However, if the grating is compressed, the reflection band progressively passes through each of the optical channels, in-turn reflecting each of the channels. Therefore, as the grating is compressed, the optical spectrum of the input signal 12 is scanned.

Current technology has addressed the problem of compressing the Bragg grating 18. The grating is compressed so that it tunes across a range of 30 nm–40 nm of the spectrum—more than sufficient to measure a 16-channel system which typically occupies wavelengths in the range 1540 nm–1560 nm. However, compressing a grating 18 is difficult because the optical fibre is likely to buckle, so destroying the control of the compression of the grating. Typically, this has been solved by compressing the grating 18 inside a cylinder of similar internal diameter as the optical fibre (for instance using a ceramic ferrule) so that the optical fibre is not able to buckle. However, it is inherently difficult to compress a fibre without buckling. Furthermore, repeated compression of a fibre inside a hard cylinder is likely to damage the fibre. In addition, friction between the fibre and the ferrule will lead to sticking and so non-linear compression of the fibre.

It would be easier to apply a strain to the fibre by stretching it rather than compress the optical fibre containing the Bragg grating 18, to effect a tuning of the reflection wavelength. Stretching will give linear extension of the fibre and no frictional damage to the fibre will occur in the absence of a hard ferrule. In the past, stretching the fibre has not been pursued because the fibre, being glass, is brittle and is likely to crack.

Tuning from 1540 nm–1560 nm requires a change in the reflected wavelength of 1.3%. The OSA of the present invention contains a Bragg grating which is stretched to alter the periodicity of the grating and so tune its reflected wavelength over the optical spectrum of the input. Taking into account Poisson's ration of 0.79, the fibre would have to be stretched by 1.64% of its length to allow tuning across the required spectral range of the OSA input. Allowing for extra stretch at the beginning and end of the tuning range, the glass fibre would have to be stretched by approximately 1.8% of its length to tune across the entire spectral range. In a field application, the OSA meter would be expected to survive to up to 10,000 cycles with a 90% reliability if it were used to check the channels in a multi-channel optical system over a lifetime of 3 years. Therefore, the grating in the OSA must be stretched by approximately 1.8% up to 10,000 times in its lifetime.

Figure 3:
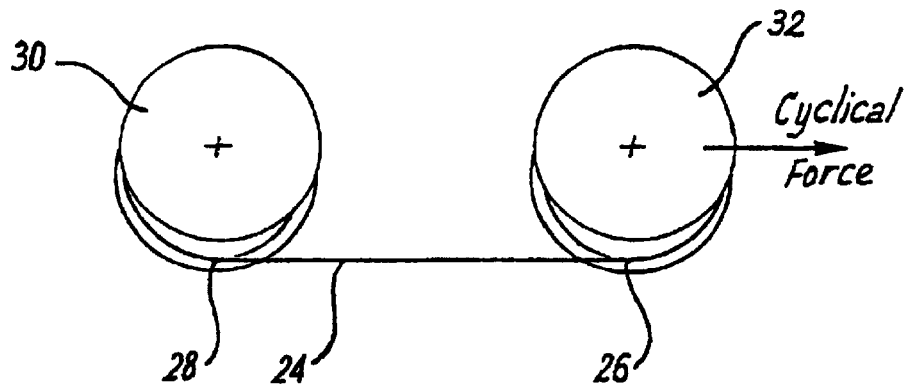
FIG. 3 shows means operable to apply a variable strain to a section of fibre, suitable for use in an OSA according to the present invention.

Lifetime tests under a cyclical load were carried out on Corning single mode fibre (SMF). The number of cycles to failure was measured where the fibre was cycled between zero and a maximum stress. The coated fibre 24 was held at two points 26,28 so that it could be stretched by moving apart the holding points, as shown in FIG. 3. The fibre 24 was secured at both points 26,28 by wrapping it several times around two mandrels 30,32 of approximate diameter of 25 mm, with the coated fibre lying in a V-shaped screw thread (not shown) with the free end of the fibre 24 glued onto the mandrel. One mandrel 30 was fixed and the other mandrel 32 was moved away with a controlled force, so stretching the fibre 24 to a maximum strain The mandrels 30,32 were then moved back together again to give zero strain. The strain cycles was then repeated. The lifetime tests were carried out at approximately 25° C. and a relative humidity of 60%. The tests were carried out on a variety of fibres having different types of coatings.

Figure 4:
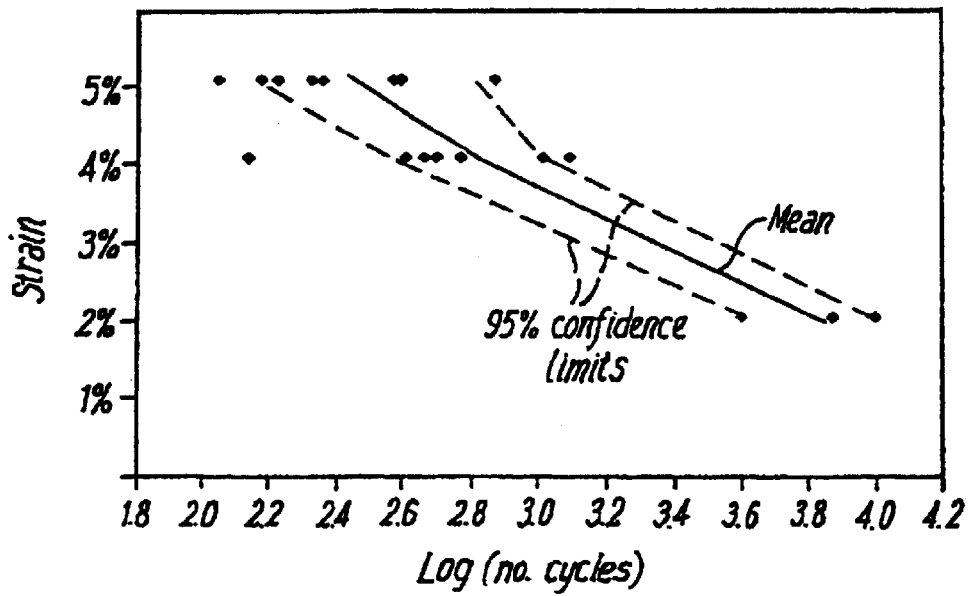
FIG. 4 is a plot showing the number of cycles of strain being applied to a section of fibre, using the apparatus of FIG. 3, before the section of fibre fails.

FIG. 4 plots the number of cycles to failure against maximum load for 10 tests and 3 tests, corresponding to strains of 5%, 4% and 2% respectively, for Corning SMF. The fibre is expected to fail due to stress-corrosion cracking. The graph shows that the fibre will last for at least 3,000 cycles when cyclically strained by up to a maximum of 2% with a 95% confidence limit. Extension of the curve shows that the fibre is likely to survive for at least 10,000 cycles when strained by 1.8% with a confidence limit of approximately 90% or more. In summary, Corning SMF can be stretched by 1.8% over 10,000 cycles, as required by a wavelength tuneable power meter. Tests have also been carried out on other fibres having different coatings, showing survival rates in eccess of 3,000 cycles for each fibre.

Pristine coated fibre would be expected largely to be free from surface cracks which might lead to stress corrosion cracking. However, in order to make Bragg gratings the coating must normally be stripped off so that the glass can be exposed to UV radiation to form the grating before being recoated. If we strip and recoat the fibre to write the gratings this strength is reduced because of the introduction of micro cracks on the surface of the fibre. The lifetime of the fibre section becomes dependent on the original fibre coating, the stripping/recoating process and the mandrel material.

The OSA of the present invention includes arrangements of fibre Bragg gratings in Which each grating can be stretched by less than 1.8% and still tune across the entire spectrum, as described in more detail hereinafter.

Figure 5:
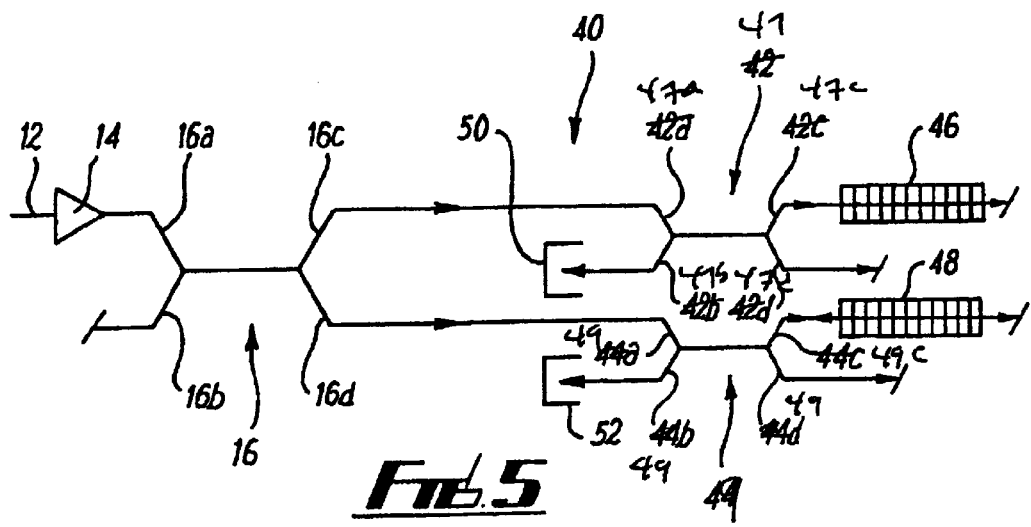
FIG. 5 is a schematic representation of a second OSA according to the present invention.

Referring to FIGS. 5 to 10, the use of the FBGs that each scan adjacent wavelength bands would allow each fibre to be stretched by approximately half as much as compared to FIG. 1, whilst still scanning the full wavelength range of 1540 nm–1560 nm. FIG. 5 shows a second embodiment of an OSA 40 according to the present invention in which the same reference numerals are retained for corresponding features, in which the incoming light 42 is split by the 50:50 2×2 coupler. Each output is then passed through 50:50 2×2 couplers 47 and 49 respectively. The outputs from the legs 16c, 16d on the second side of the coupler 16 are respectively passed into a grating 46,48. One grating 46 is stretched to tune its peak wavelength from 1540 nm–1550 nm and the signal reflected by the grating 46 is passed into a photodetector 50 so scanning its reflection wavelength over channels 1–9 of the input signal 12. The second grating 48 is stretched to tune its peak wavelength from 1550 nm–1560 nm and the signal reflected by the grating 48 is passed into a second photodetector 52, so scanning it reflection wavelength over channels 9–16 of thinput signal 12. Consequently, the entire spectrum from 1540 nm–1560 nm is scanned, but the maximum stretch on either of the gratings 46,48 is less than 1.0%. This will dramatically increase the lifetime of the gratings. More than 2 gratings with overlapping ranges of peak wavelength can, be used, further reducing the maximum stretch required.

However, this instrument will have a Signal-to-Noise Ratio (SNR) worse by 3dB than the single grating architecture of FIG. 1, because the signal is passed through an extra coupler. Furthermore, the cost will be higher because there are twice as many couplers, detectors and gratings. This invention also envisages splitting the signal into more than two gratings and detectors, so further reducing the maximum stretch required by each grating to allow the entire spectrum to be scanned.

In summary, stretching two or more gratings reduces the total amount of stretch required, allowing the entire spectrum to be scanned whilst reducing the risk of the fibre breaking under repeated cycling.

Multiple gratings can be used to reduce the maximum amount of stretch and increase the lifetime which can be achieved, whilst maintaining the SNR, couplers and detectors as for the OSA 10 having a single grating. Referring to FIG. 6, keeping the same reference numerals for corresponding features, there is shown an OSA 60 being generally the same as the OSA 10 of FIG. 1, with the exception that it has two gratings 62,64 provided in the same length of fibre. The gratings 62,64 can either be written in different locations in the fibre, as shown or may be superimposed to reduce the length of fibre that needs to be stretched.

An example of an application for this OSA 60 would be to measure 16 channels of a multi-channel optical system. The peak wavelength of each grating 62,64 is separated by approximately 10 nm. The first grating 62 when unstrained reflecting at 1540 nm and the second grating 64 when unstrained reflecting at approximately 1550 nm. The reflections of the two gratings 62,64 are arranged to act as a Vernier type scale with respect to the spacing of the channels in the optical spectrum 12. The reflection bands of the two gratings 62,64 are different by (Integer+½) times the optical channel spacing. FIG. 7a shows a plot of the channels in the optical input, the channels being of different wavelengths. As the fibre is stretched the first grating 62 will reflect Channel 1 in the spectrum, as shown in FIG. 7a. Further stretching of the fibre will lose the Channel 1's reflection. As the fibre is further stretched the second grating 64 will reflect Channel 9, as shown in FIG. 7b.

Consequently, the fibre need only be stretched by a minimum of 0.9% to cover a 20 nm spectral range. This will significantly lengthen the lifetime of the OSA. This has the advantage over the architecture of FIG. 5 because only one detector and one coupler are needed.

Clearly, more than two gratings can be used to obtain a larger Vernier type effect. For example, using three gratings, arranged on a Vernier type scale, would require a maximum fibre stretch of approximately 0.7% to tune across the entire spectrum. However, the Vernier arrangement requires that the spacing of the optical channels should be fixed; if the spacing of the channels varies too much, the results will be ambiguous. This limits the number of Vernier grating elements that can be used.

The use of two gratings in a Vernier type scale, whereby the grating wavelengths differ by (Integer+⅓) of a channel spacing will reduce the ambiguity of the measurement; this is similar to using a three part Vernier scale, where the third element is missing. As the wavelengths of the gratings are tuned, this will result in one grating reflecting a first channel, followed by the second grating reflecting a second channel, followed by neither grating reflecting a channel, and so on as the gratings tune across the wavelengths of the remaining optical channels. The power reflected can then be monitored to check that the sequence of power reflected from each grating is as expected from the two gratings which are present and the third "grating" which is absent.

FIGS. 8a–8f show the photodetector 20 output from two gratings 62,64 used. This will further reduce the maximum strain required or extend the range over which the grating can be measured, whilst reducing the likelihood of the fibre(s) breaking.

The person skilled in the art will appreciate that the gratings in the tuneable filter can be selected to have any desired peak reflection wavelength, depending upon the type of optical fibre in which the gratings are inscribed. Hence the OSA can be used to interrogate optical signals in any desired spectral range, depending upon the optical characteristics of the optical signal source. Thus, the use of gratings of different wavelengths allows the measurement of regions of spectrum in addition to the 1530 nm–1560 nm range. This therefore enables other spectral ranges to be measured such as 1580 nm–1620 nm, which is beginning to be used in various applications, by using optical fibre manufactured from Sliica, Tellurise, Fluoride or other glass materials.

All of the above techniques reduce the power of the incoming signal due to the use of a 2×2 coupler 16, possibly leading to poor Signal-to-Noise Ratios SNR) in the detector's 20 output. The SNR can be improved by phase-locking the detector 20 to small signal oscillations in the amount of stretching of the fibre. This can conveniently be provided by piezo oscillation of the fixed mandrel 30, or moving mandrel 32, of FIG. 3.

FIG. 10 shows a further embodiment of the present invention, the same reference numerals are retained for corresponding features. The OSA 70 shown schematically in FIG. 10 comprises a first optical fibre coupler 16, one leg 16b and one side of the coupler 16 being connected to a length of optical fibre for receiving an input signal, shown schematically at 12. One leg 16c on the other side of the coupler 16 is connected to a length of fibre having two in-fibre Bragg gratings 72,74 inscribed therein. The input signal 12 passes through the coupler 16, via legs 16b and 16c, to the gratings 72,74. Any wavelengths in the input signal 12 which match the wavelength of the reflection spectra 76,78 of either of the gratings is reflected by that grating. The reflected optical signals or signals pass through the coupler, from leg 16c to leg 16a.

Leg 16a of the first coupler 16 is connected to a leg 80d on one side of a second coupler 80. The other leg 80c on that side of the second coupler is connected to a first photodetector 82. One leg 80b on the other side of the second coupler 80 is connected to one end of a further section of fibre having a chirped in-fibre Bragg grating 84 inscribed therein. The other end of the further section of fibre is connected to a second photodetector 86.

The reflected optical signal or signals pass through the second coupler 80, via legs 80d and 80b, to the chirped grating 84. The spectral band width of the chirped grating 84 is approximately equal to the wavelength tuning range of a first grating 72. Thus, a first reflected signal reflected by the first grating 72 will also be reflected by the chirped grating 84, and will re-pass through the second coupler 80, via legs 80b and 80c, to the first photodetector 82. The first reflected signal is detected by the first photodetector 82, and the photodetector 82 generates an electrical output signal corresponding to the intensity of the first reflected signal.

An optical signal reflected by the second grating 74 will have a peak wavelength which falls outside the spectral bandwidth of the chirped grating 84. The second reflected signal with therefore be transmitted by the chirped grating 84 to the second photodetector 86, which will detect the second reflected signal and generate a corresponding electrical output signal.

FIG. 11 shows a further embodiment of the present invention, with the same reference numerals kept for corresponding features. The OSA 90 shown schematically in FIG. 11 is substantially the same as the OSA of FIG. 10, with the following differences. The two gratings 72,74 are arranged in the Vernier arrangements described above, so that only one of the gratings will reflect a channel in the input signal 12 at any one time. The second photodetector 92 is connected to leg 80a of the second coupler 80. A further section of fibre having a grating 94 inscribed therein is connected to leg 80b of the second coupler 80. The reflection of the grating 94 various with wavelength across the spectral bandwidth of the grating 94, as can be seen in the schematic representation of the reflection spectrum 96 of the grating 94 In FIG. 11. The grating 94 is a chirped Bragg grating, whose spectral bandwidth encompasses the wavelength tuning ranges of both the first and second gratings 72,74.

The optical signal reflected by one of the first and second gratings 72,74 passes through the second coupler 80 to the chirped grating 94 and to the second photodetector 92. The reflected signal is further reflected by the chirped grating 94, and re-passes through the second coupler 80, via legs 80b and 80c, to the first photodetector 82. The intensity of the signal following the further reflection by the chirped grating 94 will depend upon the wavelength of the signal.

Means (not shown) are provided for comparing the output signals from the two photodetectors 82,92. The ratio of the output signal of the second photodetector 92 to the output signal of the first photodetector 82 is calculated. The ratio is indicative of the wavelength of the reflected signal.

The optical spectrum analysers here described are likely to be temperature sensitive and possibly be subject to drift over a period of time. This would lead to a loss of accuracy in determining the absolute wavelength of any optical channel, and in extreme circumstances might lead to confusion of one channel with its neighbour. The present invention may therefore incorporate an internal wavelength reference, or an optical calibration apparatus, as described in more detail below.

FIG. 12 shows an optical calibration apparatus 100 for use with an OSA according to the present invention, the apparatus 100 being shown connected to the OSA of FIG. 1. The calibration apparatus 100 is connected between the optical isolator 14 and one leg 16a of the first coupler 16. The calibration apparatus 100 comprises an optical coupler 102; a reference grating 104 connected to one leg 102a on one side of the calibration coupler 102; and an optical source, in the form of a light emitting diode (LED) 106 connected to one leg 102c on the other side of the coupler 102. The second leg 102b on the first side of the coupler 102 is connected to the optical isolator 14, and the second leg 102d on the other side of the coupler 102 is connected to one leg 16a on first side of the first coupler 16. The LED's light is passed through the second coupler 102 into the reference Bragg grating 104 whose reflection wavelength at a standard temperature is known from independent calibration. The reflection from the grating 104 is then passed into the first coupler 16 (via the second coupler 102) and thence to the grating 18. Knowing the reflected wavelength of the reference grating 104 allows the grating 18 to be calibrated and hence calibrates the wavelength of the spectrum provided by stretching the grating 18. This provision of a calibrated wavelength can be used for a single grating architecture (FIG. 1) or multiple gratings (FIGS. 5 and 6). The reference wavelength would normally not be used during a measurement of the incoming optical signal, and therefore the OSA would be calibrated offline. Alternatively, if the reflection wavelength of the reference grating 104 was set at a slightly shorter (or longer) wavelength than the shortest (longest) wavelength being measured, the OSA could be calibrated during each measurement.

FIG. 13 shows an alternative optical calibration apparatus 110 for use with an OSA according to the present invention. The same reference numerals are used for corresponding features. The calibration apparatus 110 replaces the or one photodetector 20,50,52 when used with the OSAs shown in FIGS. 1, 5 and 6, and replaces the second coupler 80, the chirped gratings 84,94 and the photodetector 82,86, 92 when used with the OSAs shown in FIGS. 10 and 11. The optical calibration apparatus 110 is shown connected to an OSA similar to the OSA shown in FIG. 1.

The calibration apparatus 110 comprises: an optical fibre coupler 112; a first photodetector 114 connected to one leg 112a on a first side of the calibration coupler 112; an in-fibre grating, in the form of a sampled grating 116, whose reflectivity varies as a function of wavelength across the optical band width of the grating 116, as shown schematically at 118, connected to the other leg 112b on the first side of the coupler 112; a second photodetector 120 connected to one leg 112c on the other side of the coupler 112; and means (not shown) operable to compare the outputs of the photodetectors 114, 120. The second leg 112d of the other side of the calibration coupler 112 is connected to leg 16a of the first coupler 16. The sampled grating 116 reflects a-comb of narrow peaks and is a thermalised, hence the wavelengths of the peaks do not vary with temperature. The wavelengths of at least some of the peaks correspond to ITU grid wavelengths.

An input optical signal 12 comprising, for example, 16 channels is routed to the grating 18 in the tunable optical filter. As the peak wavelength of the grating 18 is tuned across the spectral bandwidth of the input signal 12, the various channels will be reflected by the grating 18, in turn, and transmitted through the first coupler 16 to the calibration coupler 112. The reflected signals are transmitted through legs 112a and 112b of the coupler to the first photodetector 114 and the sampled grating 116. The reflected signals are further reflected by the sampled grating 116, and transmitted to the second photodetector 120, via legs 112b and 112c of the coupler 112. The intensity of each signal following the further reflection is dependent upon its wavelength. Each reflected signal is detected in turn by each photodetector 114,120, as described. The output signal from each photodetector 114,120, which comprises a series of peaks, is recorded in time, over the period taken to tune the peak wavelength of the grating 18 over the desired spectral range. The signal pattern recorded from the second photodetector 120 is essentially a convolution of the input signal 12 and the reflection spectrum of the sampled grating 116. Knowing the spectral profile of the sampled grating 116, and the position of the peaks within the spectral profile, enables identification of when the reflected signal was of a particular wavelength.

The means for comparing the output signals of the photodetectors 114,120 calculates the ratio of the output signal from the first photodetector 114 to that of the second photodetector 120. The ratio is indicative of the wavelength of the reflected signal, and hence the peak reflection wavelength of the grating 18.

A further calibration apparatus 130 is shown in FIG. 14, with the same reference numerals retained for corresponding features. The calibration apparatus 130 of FIG. 14 is the same as the calibration apparatus 110 of FIG. 13, with the following modification. A chirped Bragg grating 132 is connected to leg 112b of the calibration coupler 112. The reflectivity of the chirped grating 132 varies as a function of wavelength across its spectral bandwidth, as schematicaly illustrated at 134 in FIG. 14, so that again, the ratio measured at 114,120 is indicative of the wavelength detected.

A further alternative optical calibration apparatus 140 is shown in FIG. 15, with the same reference numerals retained for corresponding features. The calibration apparatus 140 replaces the grating 18, or the or one of the gratings 46,48,62,64,72,74 when used with the OSAs shown in FIGS. 1, 5, 6, 10 and 11. The optical calibration apparatus 140 is shown connected to an OSA similar to the OSA shown in FIG. 1.

The optical calibration apparatus comprises: a 1300 nm/1550 nm fibre wavelength division multiplexer (WDM) 142, connected, via one leg 142a on a first side, to leg 16c of the first coupler 16; a section of fibre having two gratings 144,146 inscribed therein, connected at one end to one leg 142c on the other side of the WDM 142; a further fibre coupler 148, connected, via one leg 148c to the second leg 142b on the first side of the WDM 142; a further section of fibre having a broadband fibre grating filter 150 inscribed therein, connected at one end to leg 148a of the calibration coupler 148, and at the other end to a first photodetector 152; and a broadband optical source 154 connected to leg 148b of the calibration coupler 148.

The two gratings 144,146 are superimposed one upon the other in the same section of fibre, or are adjacent one another. The peak wavelength of the first grating 144 is at approximately 1300 nm and the peak wavelength of the second grating 146 is at approximately 1540 nm. The broadband grating filter 150 has an optical reflection spectrum which includes a plurality of passbands at itu grid wavelengths, as shown schematically at 156. The broadband grating filter 150 may be a Moiré grating, a series of superimposed uniform-period gratings, or an array of uniform-period gratings.

The broadband optical source 154 is an LED whose optical output is centred at approximately 1300 nm. The LED 154 provides an optical signal to be reflected by the first grating 144.

In operation, a variable strain is applied to the gratings 144,146, using apparatus to be described hereinafter, to tune the wavelengths of the gratings across set wavelength ranges. The signal reflected from the first grating 144 is routed to the calibration coupler, via the WVDM 142, and on to the grating filter 156 and the photodetector 152.

The grating filter 150 is a thermalised, or the exact wavelength offset due to temperature effects is deduced from the temperature experienced by the filter 150, therefore the exact wavelength of the grating filter 150 is known. The wavelength of the first grating 144 when a strain is applied to the grating 144 is determined from the spectrum of the optical signal transmitted by the grating filter 150.

Once the wavelength of the first grating 144 is known, the strain applied to the gratings 144,146 can be determined. Knowing the strain applied to the second grating 146 enables the wavelength of the second grating 146 to be calculated.

Strain is applied to the grating or gratings in each of the above described OSAs using the apparatus 160 shown in FIG. 16. The apparatus comprises two graphite mandrels 162,164. Graphite is used because it is a self-lubricating material and thus the amount of damage caused to a fibre 166 mounted on the mandrels 162,164 is minimised.

Grooves (not shown) of V-shaped section are provided around the cylindrical face of the mandrels 162,164 for receiving a length of fibre 166. The section or sections of fibre 168 including the grating or gratings extends between the mandrels 162,164. The lengths of fibre 166 on either side of the grating section 168 are wound around the respective mandrel 162,164 a sufficient number of times to hold the fibre 166 in place by friction The mandrels 162,164 are rotatably mounted on a base plate 174. One mandrel 162 is freely rotatable and the second mandrel 164 is mounted for rotational movement on a motor (not shown). To apply a strain to the grating section 168, the second mandrel 164 is rotated in the direction of arrow R in the figure.

A metal beam 170 is mounted at one end on the first mandrel 162, and extends past a beam stop 172 provided on the base plate 174. An electrical strain gauge (not shown) is incorporated into the beam 170. As the second mandrel 164 rotates, a pulling force is exerted on the grating section 168, thereby causing a corresponding rotation of the first mandrel 162 until the other end of the beam 170 abuts the beam stop 172. As the second mandrel 164 continues to rotate further rotation of the first mandrel 162 is prevented. A strain is thereby applied to the grating section 168, and also to the beam 170. The strain applied to the beam 170 is measured by the strain gauge. From the strain gauge reading the amount of strain applied to the grating section 168, and hence the wavelength of the grating or gratings, can be inferred.

Alternatively, the strain gauge m ay be attached to or printed directly onto the grating section or sections 168 of the fibre 166.

Typical values for the Full-Width-Halfe Maximum (a VHM) bandwidth and the Side-Lobe-Suppression-Ratio (SLSR) of fibre Bragg gratings are 0.1 nm and −30 db respectively. A single g rating stretched by 1.8% to cover the entire spectrum from 1540 nm–1560 nm will estimate power in each peak to an accuracy of +/−5%. This figure arises where the side lobes are only suppressed to −25 dB and the other 15 channels will contribute small amounts of power to the signal of the channel being measured, hence increasing the apparent detected power. The peak position will be determined to within the step size of the measuring system, which will be approximately ¹⁄₁₆th of the peak spacing, giving a wavelength accuracy of the peak position to approximately +/−0.05 nm. Temperature effects will be negligible because of the internal calibration wavelength (see below).

All of the OSAs shown in the figures optionally include an optical isolator 14 to prevent ants light reflected from any of the Bragg gratings 18,46,48,64,72, 74 being reflected back into the optical system that the OSA is measuring.

Splitting the spectrum into two or more segments and stretching single gratings to cover that fraction of the spectrum will not add to the inaccuracy because it can be designed so that one peak is measured by at least two gratings.

The use of two or more Vernier grating elements will be more susceptible to variation in channel wavelengths and the resolution of the gratings because there will be significant overlap of the tails of the reflection wavelengths of each grating. If two Vernier elements are used, nearly but not exactly, ½channel spacing apart, approximately 1% of the power in the tails of the two reflections will overlap (assuming 0.8 nm channel spacing and FWHM of 0.15 nm). This will slightly worsen the power sensitivity by approximately 1%. However, the Vernier grating elements may give ambiguous results if one channel drifts in wavelength.

The temperature sensitivity of the OSAs here described will be substantially reduced if the Bragg grating providing the reference wavelength is mounted close to the Bragg gratings which are being stretched. Any temperature variation will therefore have a similar effect on all of the gratings, therefore temperature drift of the gratings being stretched is largely cancelled out by an approximately equal temperature drift of the calibration wavelength. The temperature accuracy can be further improved by calibrating the system performance with temperature and correcting for any errors.

It will be appreciated that the OSAs described above may include a different number of fibre Bragg gratings in their tuneable optical filters than described. A greater number of gratings may be used to either extend the wavelength tuning range of the tuneable optical filters, or to reduce the required wavelength tuning range of individual gratings. One or more optical fibres couplers may each be replaced by an optical fibre circulator.

What is claimed is:

1. An optical spectrum analyser comprising:
   a length of optical fibre for receiving an input optical signal;
   a tuneable optical filter in optical communication with the input fibre, the tuneable optical filter including a first in-fibre Bragg grating inscribed in a first section of fibre, and means operable to apply a variable axial force to the first section of fibre, to thereby tune the peak wavelength of the grating over a desired wavelength range; and
   optical detection means operable to detect an optical signal selected by the tuneable optical filter.

2. An optical spectrum analyser according to claim 1 in which the tuneable optical filter includes first and second in-fibre Bragg gratings inscribed in first and second sections of fibre respectively, the spectra of the gratings having different peak wavelengths.

3. An optical spectrum analyser according to claim 2 in which the peak wavelengths of the gratings are tunable over different wavelength ranges, the ranges being of substantially the same spectral width.

4. An optical spectrum analyser according to claim 3 in which the wavelength tuning ranges substantially abut or overlap in wavelength space.

5. An optical spectrum analyser according to claim 4 in which the combined wavelength tuning range of the two gratings extends from approximately 1530 nanometers to approximately 1560 nanometers.

6. An optical spectrum analyser according to claim 4 in which the combined wavelength tuning range of the two gratings may extend from approximately 1580 nanometers to approximately 1620 nanometers.

7. An optical spectrum analyser according to claim 2 in which an optical signal selected by the tunable optical filter is reflected by only one grating.

8. An optical spectrum analyser according to claim 7 in which the optical spectrum analyser further comprises an optical fibre signal routing means.

9. An optical spectrum analyser according to claim 8 in which the optical fibre signal routing means comprises a first optical fibre coupler, one leg on one side of the coupler being communicatively connected to the input fibre and one leg on the other side of the coupler being communicatively connected to the tunable optical filter.

10. An optical spectrum analyser according to claim 9 in which an optical isolator is provided between the input fibre and the one leg on one side of the coupler.

11. An optical spectrum analyser according to claim 9 in which the optical detection means is communicatively connected to the second leg on the one side of the first coupler.

12. An optical spectrum analyser according to claim 11 in which the optical detection means comprises a first photodetector.

13. An optical spectrum analyser according to claim 12 in which the optical detection means further comprises a second optical fibre coupler, one leg on one side of the second coupler being communicatively connected to the photodetector, and one leg on the second side of the second coupler being communicatively connected to the second leg on the one side of the first coupler, and a second photodetector communicatively connected to the second leg on the second side of the second coupler.

14. An optical spectrum analyser according to claim 13 in which the optical detection means further comprises a broadband, in-fibre optical filter, in the form of a chirped in-fibre Bragg grating communicatively connected between the first photodetector and the one leg on one side of the second coupler.

15. An optical spectrum analyser according to claim 14 in which the optical bandwidth of the chirped Bragg grating substantially extends over the wavelength tuning range of one of the two gratings, such that the chirped Bragg grating reflects an optical signal reflected by the said one grating to the second photodetector and transmits an optical signal reflected by the other grating to the first photodetector.

16. An optical spectrum analyser according to claim 13 in which the optical detection means filter comprises a broadband, in-fibre optical filter communicatively connected to the second leg on the one side of the second coupler, the optical filter reflecting an optical signal reflected by either grating to the second photodetector.

17. An optical spectrum analyser according to claim 16 in which the reflectivity of the optical filter varies as a function of wavelength across the optical bandwidth of the optical filter.

18. An optical spectrum analyser according to claim 17 in which the optical filter is a chirped in-fibre Bragg grating.

19. An optical spectrum analyser according to claim 17 in which the optical filter is an in-fibre sampled grating.

20. An optical spectrum analyser according to claim 16 in which the optical spectrum analyser further includes means operable to compare the output signals of the first and second photodetectors, to thereby determine the wavelength of the optical signal reflected from one of the gratings.

21. An optical spectrum analyser according to claim 20 in which the said means is operable to calculate the ratio of the amplitude of the output signal of the first photodetector to the amplitude of the output signal of the second photodetector, the ratio being indicative of the wavelength of the signal reflected from one of the gratings.

22. An optical spectrum analyser according to claim 13 in which the optical spectrum analyser further comprises means operable to reduce the signal to noise ratio in the output signal of a or each photodetector, the said means comprising phase-lock loop apparatus connected to the respective means for applying a variable force and the said photodetector.

23. An optical spectrum analyser according to claim 13 in which one or more of said optical fibre couplers is a 50: 50 2×2 optical fibre coupler.

24. An optical spectrum analyser according to claim 23 in which an end of any unconnected legs on any of the couplers are terminated with an angled cleave, to thereby substantially reduce any optical reflections from the said ends.

25. An optical spectrum analyser according to claim 23 in which the ends of the said unconnected legs are terminated in an index matching compound, to thereby substantially reduce any optical reflections from the said ends.

26. An optical spectrum analyser according to claim 9 in which the first and second sections of fibre are provided in physically separate first and second grating lengths of optical fibre, the grating lengths of fibre being physically long compared to the said sections.

27. An optical spectrum analyser according to claim 26 in which two optical detection means are provided, a first optical detection means being communicatively connected between one leg on the second side of the first coupler and the first grating length, and a second optical detection means being communicatively connected between the second leg on the second side of the first coupler and the second grating length.

28. An optical spectrum analyser according to claim 27 in which the detection means each comprise a further optical coupler communicatively connected to the respective grating lengths, the respective legs on the first coupler and to a photodetector; one leg on one side of the further optical coupler is communicatively connected to the respective one of the legs on the second side of the first coupler, the second leg on the one side of the further coupler is communicatively connected to the photodetector, and one leg on the second side of the further coupler is communicatively connected to the respective grating length.

29. An optical spectrum analyser according to claim 26 in which each of the grating lengths of fibre is mounted on a separate means operable to apply a variable strain to a respective one of the first and second sections of fibre, the said means being operable to enable a variable strain to be applied to each of the first and second sections of fibre at either the same time or at different times.

30. An optical spectrum analyser according to claim 7 in which the optical fibre signal routing means is an optical fibre circulator.

31. An optical spectrum analyser according to claim 2 in which the first and second sections of fibre are located within a grating length of optical fibre, the grating length of fibre being long compared to the lengths of said sections.

32. An optical spectrum analyser according to claim 31 in which the first and second sections of fibre, and hence the gratings, are spatially separate within the grating length of fibre.

33. An optical spectrum analyser according to claim 31 in which the first and second sections of fibre are the same section of fibre, the gratings being inscribed in the same section of fibre and thus being superimposed one upon the other.

34. An optical spectrum analyser according to claim 31 wherein said means operable to apply a variable axial force applies a strain and wherein the grating length of optical fibre is mounted on the means operable to apply a variable strain, to thereby enable a variable strain to be applied to the first and second sections of fibre, and hence to both gratings, at the same time.

35. An optical spectrum analyser according to claim 2 in which the tunable optical filter includes more than two in-fibre Bragg gratings, each grating being inscribed in a respective section of fibre.

36. An optical spectrum analyser according to claim 2 in which the optical spectrum analyser further comprises optical calibration apparatus for calibrating the peak wavelength of the or each grating in the tunable optical filter.

37. An optical spectrum analyser according to claim 36 in which the optical calibration apparatus comprises: an optical fibre coupler; a first section of fibre having a first reference Bragg grating inscribed therein, the said section of fibre being communicatively connectable to one leg on one side of the calibration coupler; and an optical source communicatively connected to one leg on the second side of the calibration coupler.

38. An optical spectrum analyser according to claim 37 in which the peak wavelength of the first reference grating falls within the wavelength tuning range of one of the gratings in the tunable optical filter.

39. An optical spectrum analyser according to claim 38 in which a further reference grating is provided in a further section of fibre for each further grating in the tunable filter, the peak wavelength of each further reference grating falling within the wavelength tuning range of the corresponding grating.

40. An optical spectrum analyser according to claim 39 in which the further section or sections of fibre are each communicatively connectable to the calibration coupler in place of the first section of fibre, each further reference grating thereby replacing the first reference grating.

41. An optical spectrum analyser according to claim 40 which the or each reference grating is a thermalised, or the peak wavelength of the or each reference grating is known at a specified temperature, from independent calibration.

42. An optical spectrum analyser according to claim 39 in which the optical source is a light emitting diode, the optical output spectrum of the light emitting diode including the peak wavelength of the or each reference grating.

43. An optical spectrum analyser according to claim 37 in which the optical calibration apparatus is connectable to the optical spectrum analyser between the input length of fibre and the tunable optical filter, to thereby provide an alternative input signal to the optical spectrum analyser, the second leg on one side of the calibration coupler being communicatively connectable to the input length of fibre and the second leg on the second side of the calibration coupler being communicatively connectable to the one leg on one side of the first coupler.

44. An optical spectrum analyser according to claim 36 in which the optical calibration apparatus comprises: an optical fibre coupler; a first section of fibre having a first reference grating inscribed therein, the said section of fibre being communicatively connectable to one leg on one side of the calibration coupler; first and second photodetectors communicatively connected to the second leg on one side and one leg on the second side of the calibration coupler respectively; and means operable to compare the output signals of the photodetectors.

45. An optical spectrum analyser according to claim 44 in which the optical spectrum of the first reference grating falls within the wavelength tuning range of one of the gratings in the tunable optical filter.

46. An optical spectrum analyser according to claim 45 in which a further reference grating is provided in a further section of fibre for each further grating in the tunable filter, the optical spectrum of each further reference grating falling within the wavelength tuning range of the corresponding grating.

47. An optical spectrum analyser according to claim 46 in which the further section or sections of fibre are each communicatively connectable to the calibration coupler in place of the first section of fibre, each further reference grating thereby replacing the first reference grating.

48. An optical spectrum analyser according to claim 46 in which the reflectivity of the or each reference grating varies as a function of wavelength across its spectral bandwidth, such that the intensity of an optical signal reflected by a reference grating is dependent on the wavelength of the optical signal.

49. An optical spectrum analyser according to claim 48 in which the or each reference grating has a plurality of reflectivity peaks included within its spectral profile.

50. An optical spectrum analyser according to claim 49 in which the or each reference grating is a sampled grating.

51. An optical spectrum analyser according to claim 49 in which the or each reference grating is a moire grating.

52. An optical spectrum analyser according to claim 49 in which the or each reference grating comprises an array of uniform period Bragg gratings.

53. An optical spectrum analyser according to claim 48 in which the or each reference grating is a chirped Bragg grating.

54. An optical spectrum analyser according to claim 46 in which the or each reference grating is a thermalised.

55. An optical spectrum analyser according to claim 44 in which the optical calibration apparatus is connectable to the optical spectrum analyser in place of the or a photodetector within the optical detection means, the first photodetector detecting a part of an optical input signal reflected by the tunable optical filter and the second photodetector detecting the said part of the input signal reflected by the tunable optical filter and the reference grating.

56. An optical spectrum analyser according to claim 55 in which the outputs of the photodetectors are connected to the means operable to compare the output signals, the said means being operable to calculate the ratio of the output signal of the first photodetector to that of the second photodetector, the ratio being indicative of the wavelength of the detected optical signal.

57. An optical spectrum analyser according to claim 36 in which the optical calibration apparatus comprises: an in-fibre wavelength division multiplexing (WDM) device, one leg on one side of the WDM device being communicatively connectable to the second leg on the second side of the first coupler; a first section of fibre having two in-fibre Bragg gratings inscribed therein and communicatively connected to one leg on the second side of the WDM device; an optical fibre coupler, one leg on one side of the coupler being communicatively connected to the second leg on the one side of the WDM device; a broadband optical source communicatively connected to one leg on the second side of the calibration coupler; a second section of fibre having a reference grating inscribed therein and communicatively connected at one end to the second leg on the second side of the calibration coupler; and a photodetector communicatively connected to the other end of the second section of fibre.

58. An optical spectrum analyser according to claim 57 in which the peak wavelengths of the gratings are widely separated.

59. An optical spectrum analyser according to claim 58 in which the peak wavelength of the first grating is within the wavelength tuning range of the tunable optical filter.

60. An optical spectrum analyser according to claim 59 in which the peak wavelength of the first grating is within the 1540 nanometers to 1560 nanometers wavelength range.

61. An optical spectrum analyser according to claim 58 in which the peak wavelength of the second grating is within the 1290 nanometers to 1310 nanometers wavelength range.

62. An optical spectrum analyser according to claim 57 in which the optical source is a broadband light emitting diode, the optical spectrum of the light emitting diode including the peak wavelength of the second grating.

63. An optical spectrum analyser according to claim 57 in which the photodetector is operable to detect an optical signal reflected by the second grating.

64. An optical spectrum analyser according to claim 57 in which the optical spectrum of the reference grating includes a plurality of passbands, such that only wavelengths of light which correspond to the wavelengths of the passbands are transmitted to the photodetector.

65. An optical spectrum analyser according to claim 57 in which the reference grating is a thermalised, or the wavelength offset due to temperature effects is deduced from the temperature experienced by the reference grating, the exact wavelength of the reference grating thereby being determinable.

66. An optical spectrum analyser according to claim 57 in which the reference grating comprises a sampled grating.

67. An optical spectrum analyser according to claim 57 in which the reference grating comprises a moire grating.

68. An optical spectrum analyser according to claim 57 in which the reference grating comprises a chirped Bragg grating.

69. An optical spectrum analyser according to claim 2 in which the optical signal selected by the tunable optical filter is transmitted by one grating.

70. An optical spectrum analyser according to claim 1 in which the said means is operable to apply a variable axial force to one or each of the first section and a second section of fibre.

71. An optical spectrum analyser according to claim 1 in which the optical spectrum analyser is for use with a multi-channel optical system, the channels being substantially equally spaced in wavelength space.

72. An optical spectrum analyser according to claim 71 in which the difference in the peak wavelengths of the gratings is equal to the wavelength spacing of the optical channels multiplied by a numerical factor.

73. An optical spectrum analyser according to claim 72 in which the numerical factor is equal to an integer plus a fraction of one, such as one half or one third.

74. An optical spectrum analyser according to claim 1 in which a full width half maximum spectral bandwidth of the or each grating is between 0.05 nanometers and 0.5 nanometers.

75. An optical spectrum analyser according to claim 1 in which a side-lobe suppression ratio of the or each grating is greater than −20 dB.

76. An optical spectrum analyser according to claim 1 in which the axial force is strain.

77. An optical spectrum analyser according to claim 76 in which the peak wavelength of each grating, when unstrained, is less than the wavelengths of optical channels present within the respective wavelength tuning ranges of the gratings.

78. An optical spectrum analyser according to claim 76 in which the means operable to apply a variable strain comprises a spaced pair of mandrels, the part of the grating length of fibre including the section or sections of fibre including one or more gratings being mountable therebetween.

79. An optical spectrum analyser according to claim 78 in which the mandrels are shaped to avoid sharply bending an optical fibre wound therearound, and are substantially cylindrical in shape.

80. An optical spectrum analyser according to claim 78 in which the mandrels are fabricated from a material which minimises the forces acting between the mandrel and the fibre coating without abrading or chemically altering the fibre coating, such as a self-lubricating material, such as graphite.

81. An optical spectrum analyser according to claim 78 in which a continuous groove is provided around the outer surface of each mandrel, for receiving the parts of the grating length of fibre on either side of the section or sections of fibre including one or more gratings, the groove extending for a plurality of turns around the mandrel, to enable the said lengths of fibre to complete a sufficient number of turns around the mandrel to be held in place on the mandrel by means of frictional forces.

82. An optical spectrum analyser according to claim 78 in which the mandrels are movably mounted on a mounting member, one mandrel being rotatably mounted on the mounting member on a motor means operable to rotate the said mandrel.

83. An optical spectrum analyser according to claim 78 in which the means operable to apply a variable strain further comprises a elongate member, in the form of a metal beam, mounted on one end of the other mandrel and extending to a stop member provided on the mounting member, rotation of the one mandrel exerting a pulling force on the fibre mounted between the mandrels, thereby causing rotation of the other mandrel until the elongate member abuts the stop member, further rotation of the other mandrel thereby being prevented, such that a further rotation of the one mandrel causes strain to be applied to the said fibre and the elongate member.

84. An optical spectrum analyser according to claim 83 in which an electrical strain gauge is provided on the elongate member, the strain gauge being operable to measure the strain applied to the elongate member, to thereby enable the amount of strain applied to the section or sections of fibre including one or more gratings and hence the wavelength of the or each grating in the tunable optical filter to be inferred.

85. An optical spectrum analyser according to claim 76 in which the means operable to apply a variable strain is a thermalised.

86. An optical spectrum analyser according to claim 1 in which the axial force is compression.

87. A tunable optical filter comprising: two in-fibre Bragg gratings inscribed in first and second sections of optical fibre respectively, the spectra of the gratings having different peak wavelengths, and means operable to apply a variable axial force to one or each of the first and second sections of fibre, to thereby tune the peak wavelength of the or each grating over a desired wavelength range.

* * * * *